United States Patent
Loth et al.

(10) Patent No.: US 10,415,547 B2
(45) Date of Patent: Sep. 17, 2019

(54) 2-D FAIRING FOR A WIND TURBINE TOWER

(71) Applicants: University of Virginia Patent Foundation, Charlottesville, VA (US); The Board of Trustees of the University of Illinois, Urbana, IL (US)

(72) Inventors: Eric Loth, Charlottesville, VA (US); Michael S. Selig, Mahomet, IL (US)

(73) Assignees: University of Virginia Patent Foundation, Charlottesville, VA (US); The Board of Trustees of the University of Illinois, Urbana, IL (US)

( * ) Notice: Subject to any disclaimer, the term of this patent is extended or adjusted under 35 U.S.C. 154(b) by 130 days.

(21) Appl. No.: 14/898,085

(22) PCT Filed: Jun. 20, 2014

(86) PCT No.: PCT/US2014/043410
§ 371 (c)(1),
(2) Date: Dec. 11, 2015

(87) PCT Pub. No.: WO2014/205348
PCT Pub. Date: Dec. 24, 2014

(65) Prior Publication Data
US 2016/0138567 A1 May 19, 2016

Related U.S. Application Data

(60) Provisional application No. 61/837,235, filed on Jun. 20, 2013.

(51) Int. Cl.
*F03D 13/20* (2016.01)
*F03D 9/25* (2016.01)
*F03D 1/06* (2006.01)

(52) U.S. Cl.
CPC ............. *F03D 9/25* (2016.05); *F03D 1/0633* (2013.01); *F03D 13/20* (2016.05); *F03D 13/22* (2016.05);
(Continued)

(58) Field of Classification Search
CPC ........... F03D 13/20; F03D 13/22; F03D 13/25
See application file for complete search history.

(56) References Cited

U.S. PATENT DOCUMENTS 7,550,863 B2 * 6/2009 Versteegh ............. F03D 1/0666
290/43
7,612,462 B2 11/2009 Viterna
(Continued)

FOREIGN PATENT DOCUMENTS

DE 102009007812 A1 8/2010
EP 2436924 A1 * 4/2012 ............. F03D 80/00
(Continued)

OTHER PUBLICATIONS

"International Application Serial No. PCT/US2014/043410, International Search Report dated Oct. 23, 2014", 2 pgs.
(Continued)

Primary Examiner — Woody A Lee, Jr.
Assistant Examiner — Sabbir Hasan
(74) Attorney, Agent, or Firm — Schwegman Lundberg & Woessner, P.A.

(57) ABSTRACT

A wind turbine for generating electricity having a turbine assembly mounted on an inner support positioned within an aerodynamic fairing. The turbine assembly has an electrical generator positioned on the inner support and having a rotor shaft rotatable by a rotor blade. The aerodynamic fairing reduces the drag and wake created by the inner support.

19 Claims, 8 Drawing Sheets

(52) U.S. Cl.
CPC ....... *F05B 2240/13* (2013.01); *F05B 2240/14* (2013.01); *F05B 2240/91* (2013.01); *F05B 2240/912* (2013.01); *Y02E 10/721* (2013.01); *Y02E 10/728* (2013.01)

(56) References Cited

U.S. PATENT DOCUMENTS

| | | |
|---|---|---|
| 2009/0223164 A1 | 9/2009 | Cook et al. |
| 2012/0161443 A1 | 6/2012 | Moser et al. |
| 2013/0064663 A1 | 3/2013 | Loth et al. |

FOREIGN PATENT DOCUMENTS

| | | |
|---|---|---|
| EP | 2436924 A1 | 4/2012 |
| GB | 2484962 A | 5/2012 |
| WO | WO-2014205348 A1 | 12/2014 |

OTHER PUBLICATIONS

"International Application Serial No. PCT/US2014/043410, Written Opinion dated Oct. 23, 2014", 11 pgs.

"Application Serial No. PCT/US2014/043410, International Preliminary Report on Patentability dated Dec. 30, 2015", 7 pgs.

Loth, Eric, et al., "Morphing segmented wind turbine and related method", Google patents—US 20130064663 A1, [Online]. Retrieved from the Internet: <URL: https://www.google.com/patents/US20130064663?dq=loth+turbine&hl=en&sa=X&ei=Ff2RU43pC8mAqgblv4LoDA&ved=0CD0Q6AEwAw[Dec. 31, 2015 5:29:05 PM], (2013), 19 pgs.

Loth, Eric, et al., "Morphing Segmented Wind Turbine Concept", 28th AIAA Applied Aerodynamics Conference, AIAA 2010-4400 [Online]. Retrieved from the Internet: <URL: http://aerospace.illinois.edu/m-selig/pubs/LothSeligMoriarty-2010-AIAA-2010-4400-MorphingWindTurbine.pdf, (2010), 6 pgs.

Loth, Eric, et al., "Segmented Ultralight Pre-Aligned Rotor for Extreme-Scale Wind Turbines", 50th AIAA Aerospace Sciences Meeting including the New Horizons Forum and Aerospace Exposition, AIAA2012-1290, [Online]. Retrieved from the Internet: <URL: http://aerospace.illinois.edu/m-selig/pubs/LothSteelelchterSeligMoriarty-2012-AIAA-2012-1290.pdf, (2012), 22 pgs.

"European Application Serial No. 14813195.6, Extended European Search Report dated Jan. 19, 2017", 6 pgs.

"European Application Serial No. 14813195.6, Response filed Aug. 8, 2017 to Extended European Search Report dated Jan. 19, 2017", 14 pgs.

\* cited by examiner

2-D FAIRING FOR A WIND TURBINE TOWER

CLAIM OF PRIORITY

This patent application claims the benefit of priority, under 35 U.S.C. Section 119(e), to U.S. Provisional Patent Application Ser. No. 61/837,235, filed on Jun. 20, 2013, which is hereby incorporated by reference herein in its entirety.

TECHNICAL FIELD

This document pertains generally, but not by way of limitation, to wind turbines for generating electricity.

BACKGROUND

Recently, demand has increased for electricity generated from alternative sources other than fossil fuels and nuclear sources. A common source of alternative energy is wind driven turbines having rotor blades rotatable by the wind. The most common type of wind turbine for generating electricity is a horizontal axis wind turbine ("HAWT") in which the main rotor shaft for the generator rotates about a horizontal axis. The rotor blades extend radially from the horizontally oriented rotor shaft and rotate in a generally vertical plane oriented generally transverse to the wind direction. In an "upwind" configuration, the rotor blades are positioned upwind of the generator and the turbine tower. An inherent requirement of upwind turbines is that the rotor blades have minimal aeroelastic deflection such that the rotor blades do not deflect during rotation and strike the turbine tower as each rotor blade passes the turbine tower. Accordingly, the rotor blades for upwind turbines are typically reinforced to minimize deflection during rotation. However, the structural reinforcement increases the material requirements and the weight of the rotor blades, which decreases the efficiency of the turbine as well as increasing the cost of rotor blades for upwind turbines. The drawbacks of minimal aeroelastic rotor blades required for upwind turbines are exaggerated as the length of rotor blades have increased to provide the necessary scale required by the increased demand the electricity from wind energy. In particular, as the length of rotor blades have increased to extreme scales of over 100 m in length, the reinforcement required for upwind rotors of extreme scale turbines to minimize aeroelasticity over the entire length the rotor blades can be cost prohibitive or substantially hinder the efficiency of the wind turbine.

An alternative turbine type is a "downwind" type turbine in which the rotor blades are positioned downwind of the generator and the turbine tower when the horizontal axis is oriented parallel to the wind direction. In this arrangement, the rotor blades can be more flexible than the minimally aeroelastic rotor blades of upwind type turbine as the downwind rotor blades can flex away from the turbine tower as the rotor blades rotate about the rotor shaft. Accordingly, downwind rotor blades can be lighter and less expensive than upwind rotor blades of similar lengths. A drawback of downwind turbines not present in upwind turbines is that the downwind positioning of the rotor blades causes the rotor blades to pass through the wake created by the turbine tower and the generator. The wake momentarily slows each rotor blade as the rotor blades pass through the wake. In an addition, the wake created by the turbine tower temporarily applies aerodynamic loading to the passing rotor blades causing the rotor blades to flutter with each rotation through the wake. The fluttering of the rotor blades fatigues the rotor blade over time shortening the effective lifespan of the rotor blade as compared to similarly sized upstream rotor blades. Accordingly, the reduced initial cost of the downwind rotor blades is offset by the increased maintenance costs to repair and maintain downwind turbines.

OVERVIEW

The present inventors have recognized, among other things, that a problem to be solved can include reducing the aerodynamic drag and wake created by the turbine tower to promote efficient operation of the wind turbine and increase the effective lifetime of rotor blades. In an example, the present subject matter can provide a solution to this problem, such as by providing a turbine tower having an aerodynamic fairing positioned over an internal support to improve the aerodynamic profile of the turbine tower while providing sufficient inner support for a turbine assembly. The aerodynamic fairing can minimize the aerodynamic drag created by the inner support. The aerodynamic fairing can also be shaped to provide a smooth pressure distribution without creating large pressure gradients across the aerodynamic fairing that can result in separation, which increases the wake created by turbine tower. As the inner support can comprise a circular or generally circular cross-section to support the turbine assembly as the turbine assembly rotates on the inner support to face the wind, the aerodynamic fairing can comprise a symmetric airfoil cross-section that can be oriented toward the wind direction to reduce the drag and wake created by the tower assembly. In an example, the aerodynamic fairing can be rotatably mounted on the inner support to rotate about a center axis of the inner support. In this configuration, the aerodynamic fairing is positioned relative to the center axis of the inner support such that aerodynamic fairing has the proper moment to self-align with the wind direction. In certain examples, the aerodynamic fairing and rotor blades are configured to self-align with the wind direction such that the turbine system is operable regardless of the wind direction.

In an example, the turbine assembly supported by the turbine tower can include an electrical generator having a rotor shaft rotatable about a rotational axis by at least one rotor blade. The electrical generator can be rotatably positioned on the inner support such that the electrical generator can be rotated to align the rotational axis with wind direction. In an example, the rotor blades can be setback from the electrical generator to operate downwind of the electrical generator and the turbine tower. The reduced drag and wake provided by the aerodynamic fairing reduce the flutter of the rotor blades as the rotor blades behind the turbine tower. The aerodynamic fairing is sized such that the rotor blade is setback from the trailing edge of the aerodynamic fairing by at least a minimum setback distance.

In an example, a wind turbine, according to an example of the present disclosure, can include an inner support having a generally circular cross-section. The inner support can also have a center axis and an outer diameter. The wind turbine can also have electrical generator including a rotor shaft rotatable about a rotational axis and at least one rotor blade extending radially from the rotor shaft. The electrical generator is positioned on the inner support such that the rotor shaft extends radially outward from the center axis. The wind turbine can also include an aerodynamic fairing positioned over at least a portion of the inner support, the aerodynamic fairing having a symmetric airfoil cross-section having a chord length extending between a leading edge and a trailing edge and a maximum thickness positioned between about 25% and 35% of the chord length from the leading edge. wherein the center axis of the inner support can be positioned along the chord length between the leading edge and the maximum thickness.

A tower assembly for rotatably supporting a turbine assembly for a wind turbine, according to an example of the present disclosure, can include an inner support having a generally circular cross-section. The inner support can also have a center axis and an outer diameter. The tower assembly also including an aerodynamic fairing positioned over at least a portion of the inner support. The aerodynamic fairing can have a symmetric airfoil cross-section having a chord length extending between a leading edge and a trailing edge and a maximum thickness positioned between about 25% and 35% of the chord length from the leading edge. The center axis of the inner support can be positioned along the chord length between the leading edge and the maximum thickness.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
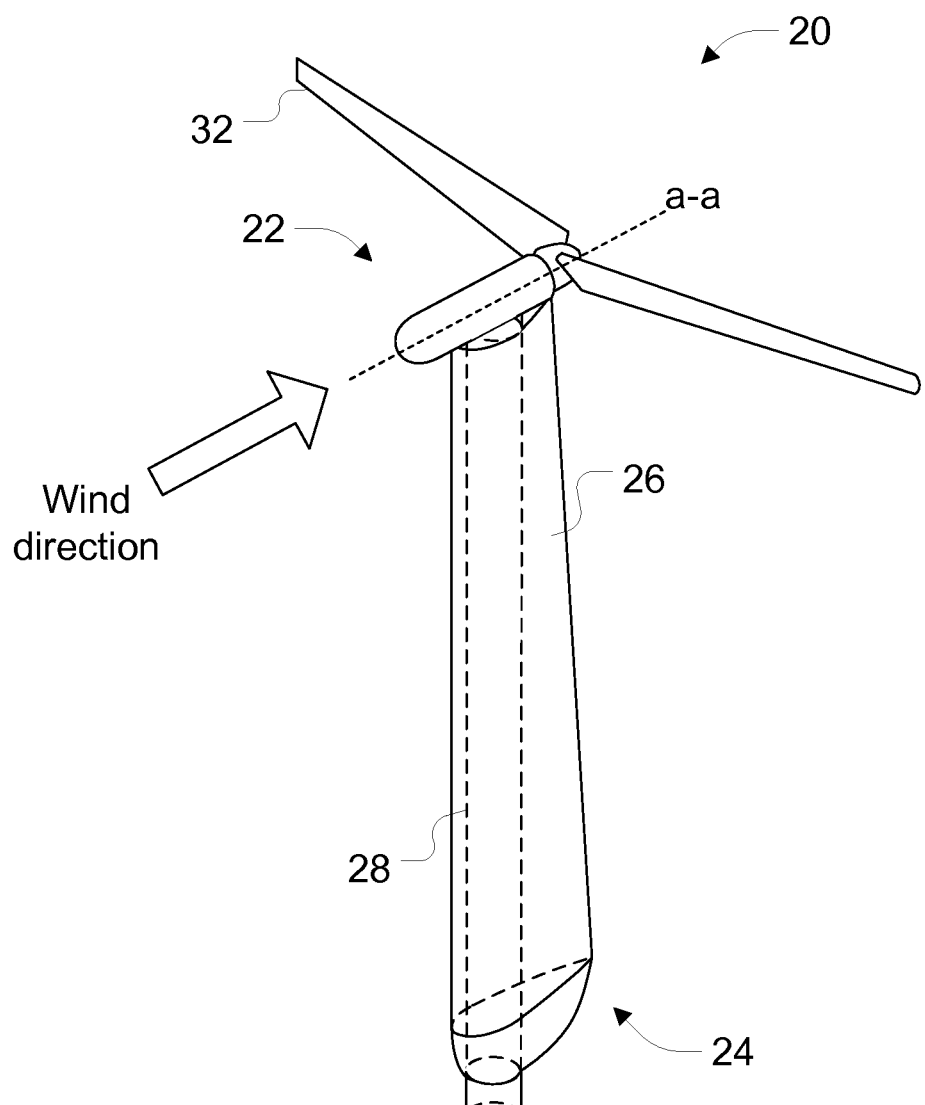
FIG. 1 is a partial cross-sectional perspective view of a wind turbine according to an example of the present subject matter.
Figure 2:
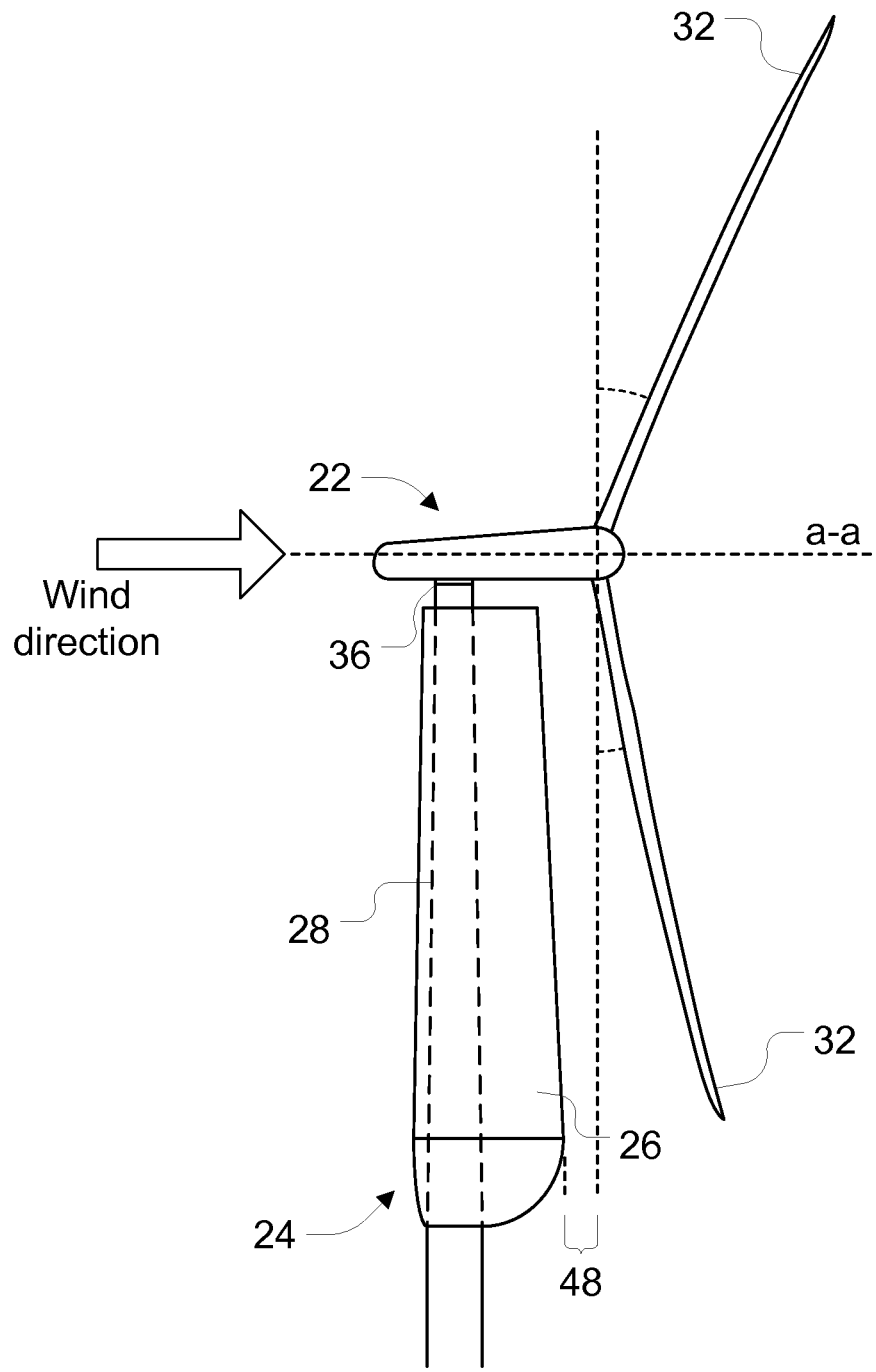
FIG. 2 is a partial cross-sectional side view of the wind turbine depicted in FIG. 1.
Figure 5:
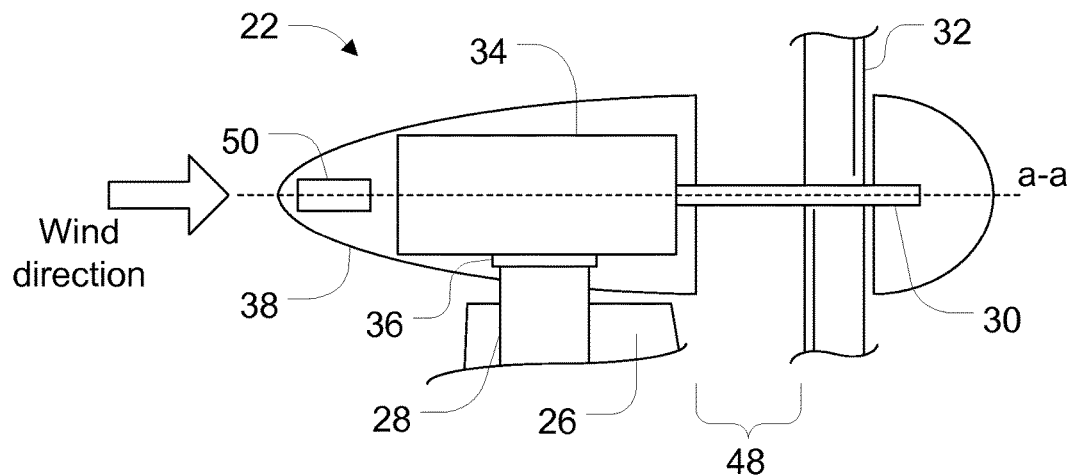
FIG. 5 is a cross-sectional side view of a turbine assembly of a wind turbine according to an example of the present subject matter illustrating a downwind rotor configuration.
Figure 6:
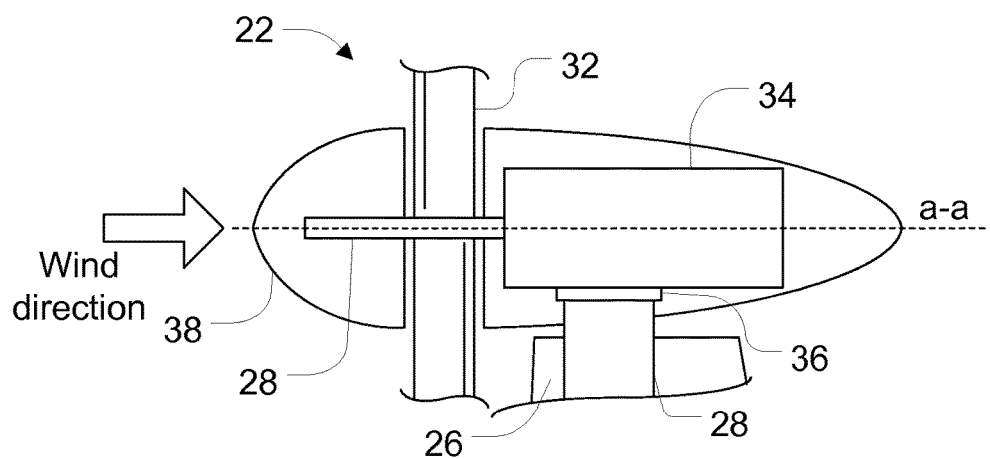
FIG. 6 is a cross-sectional side view of a turbine assembly of a wind turbine according to another example of the present subject matter illustrating an upwind rotor configuration.

As depicted in FIGS. 1-2 and 5-6, a wind turbine 20, according to an example, can include a turbine assembly 22 rotatably positioned on a tower assembly 24, the tower assembly 24 including an aerodynamic fairing 26 mounted to an internal support 28. The turbine assembly 22 can include an electrical generator 34 having rotor shaft 30 rotatable about a rotational axis a-a by at least one rotor blade 32 extending radially from the rotor shaft 30. The electrical generator 34 can be positioned on the internal support 28 such that the rotational axis a-a extends radially from a central axis b-b of the inner support 28. In an example, the rotor blades 32 can be positioned in a downwind configuration in which the rotor blades 32 rotate downwind of the tower assembly 24 such that each rotor blade 32 rotates behind the tower assembly during the rotation of the rotor blades 32 as depicted in FIGS. 1-2 and 5. In this configuration, the aerodynamic fairing 26 minimizes the wake downwind of the tower assembly 24 and experienced by downwind rotor blades 32 as the rotor blades 32 rotate behind the tower assembly 24. In certain examples, the rotor blades 32 can be optionally positioned in an upwind configuration in which the rotor blades 32 rotate upwind of the tower assembly 24 as depicted in FIG. 6. In this configuration, the aerodynamic fairing 26 is shaped to reduce the pressure gradient across the aerodynamic fairing 26 to minimize the air turbulence created as the air approaches the tower assembly 24 reducing the slowing of the upwind rotor blades 32 as the rotating rotor blades 32 pass in front of the tower assembly 24.

Referring to FIGS. 1-2, the inner support 28 rotatably supports the turbine assembly 22 and elevates the rotor shaft 30 and the rotating rotor blades 32 to an altitude for suitable for rotation by passing wind. In an example, the inner support 28 can comprise a circular cross-section having a constant diameter as depicted in FIG. 1 or having a tapered shape having an outer diameter D as depicted in FIG. 2. In an example, the inner support 28 can have a diameter D of 15 ft. at the base for a 1.5 MW wind turbine. The inventors have contemplated that the diameter D can be varied depending on the size of the rotor blades 32 and that the air fairing 26 according to the present subject matter can be adapted to inner supports 28 having different diameters D. In certain examples, the inner support 28 can comprise a polygonal cross-section oriented in a generally circular shape. As also depicted in FIGS. 1-2 and 5-6, in an example, the inner support 28 can include a rotatable mount 36 that permits the turbine assembly 22 to rotate on the inner support 28 to align the rotational axis a-a with the wind direction. The circular or generally circular cross-section provides continuous support to the turbine assembly 22 as the turbine assembly 22 is rotated on the inner support 28 to orient the rotor blades 32 to face the wind direction.

Figure 3:
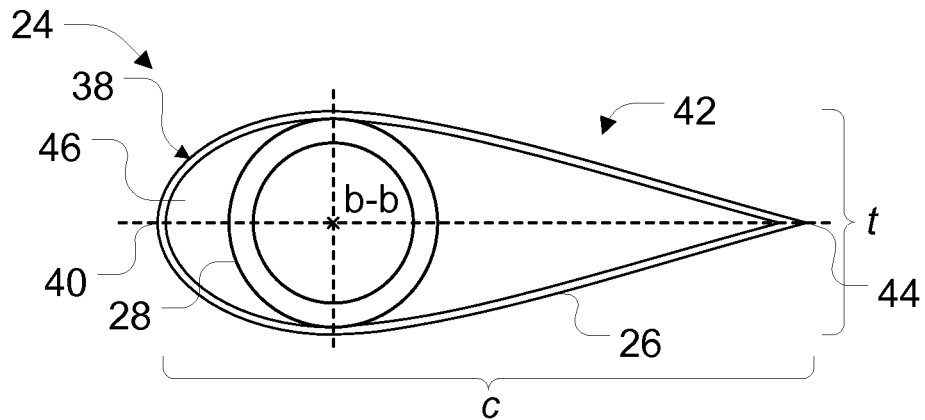
FIG. 3 is a cross-sectional top view of a tower assembly of a wind turbine according to an example of the present subject matter in which an inner support is positioned at a maximum thickness of an aerodynamic fairing.
Figure 4:
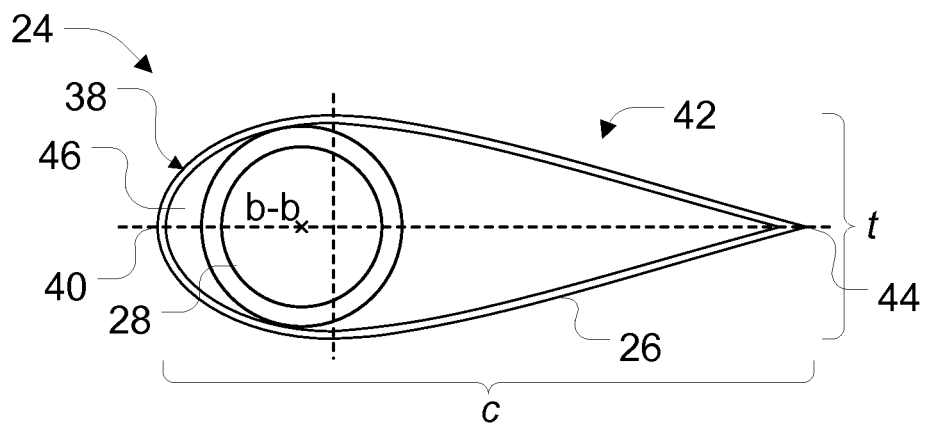
FIG. 4 is a cross-sectional top view of a tower assembly of a wind turbine according to another example of the present subject matter in which an inner support is positioned forward of a maximum thickness of an aerodynamic fairing.

As depicted in FIGS. 1-4, in an example, the aerodynamic fairing 26 can be positioned over the inner support 28 to reduce turbulent airflow upwind and downwind of the inner support 28. The aerodynamic fairing 26 comprises a symmetric airfoil shape having a shaped nose portion 38 presenting a leading edge 40 and a tail portion 42 that tapers to a trailing edge 44. The aerodynamic fairing 26 can have a chord length c extending between the leading edge 40 and the tail portion 42. The chord length c defines the vertical center plane of the aerodynamic fairing 26. In an example, the aerodynamic fairing 26 comprises a continuous-curvature curving from the leading edge 40 to a maximum thickness t and tapering to the trailing edge 44 as illustrated in FIGS. 3-4. As depicted in FIGS. 3-4, the trailing edge 44 comprises a tapered edge. In other examples, the trailing edge 44 can have a rounded profile having an elliptical or cylindrical close-out. The rounded profile of the trailing edge 44 reduces the likelihood of flow separation when the wind direction or gusts of wind have a higher angle of attack relative to the aerodynamic fairing.

Figure 7:
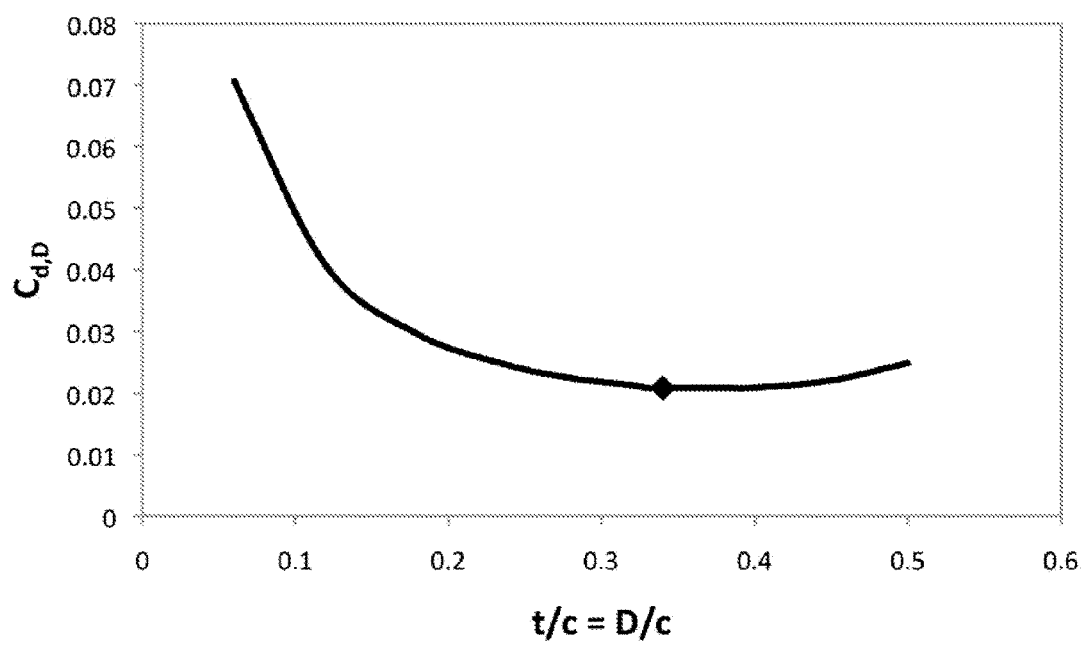
FIG. 7 is a graphical representation of pressure coefficient as a function of position along the chord length of the aerodynamic fairing according to various examples of the present subject matter.
Figure 8:
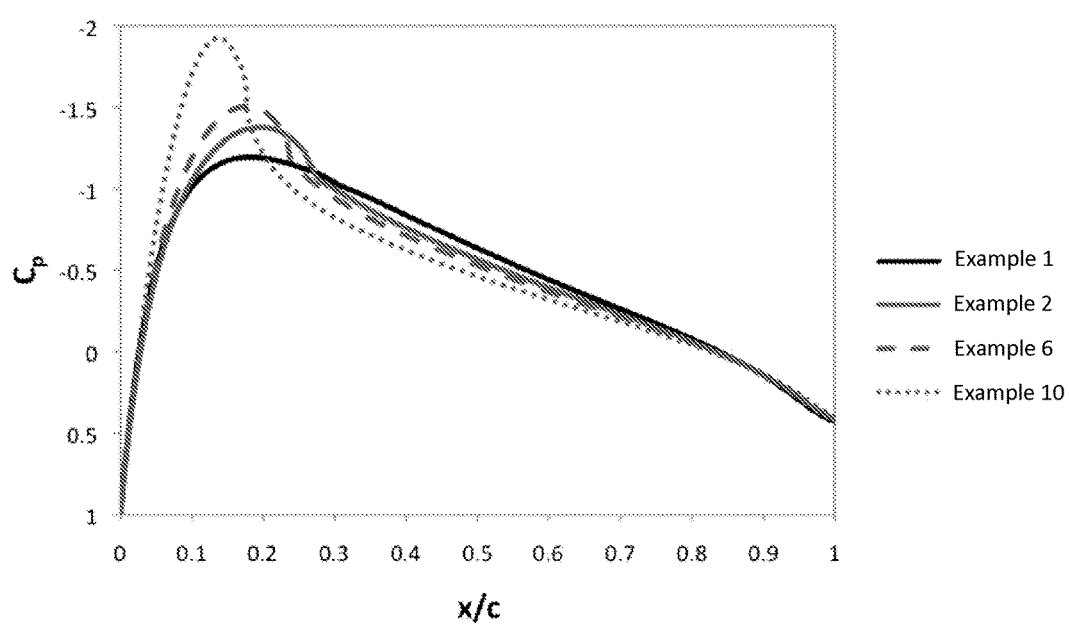
FIG. 8 is a graphical representation of pressure coefficient as a function of position along the chord length of the aerodynamic fairing in which the surface geometric slope of the aerodynamic fairing can be non-zero at the maximum thickness according to various examples of the present subject matter.

In an example, the thickness t is at least the outer diameter D of the inner support 28 such that the inner support 28 can be positioned within the aerodynamic fairing 26. In certain examples, the aerodynamic fairing 26 is constrained such that the surface geometric slope of the aerodynamic fairing 26 at the maximum thickness t is fixed at zero. In other examples, the aerodynamic fairing 26 is unconstrained such that the surface geometric slope of the aerodynamic fairing 26 at the maximum thickness t can be non-zero. As illustrated in FIGS. 7-8, the unconstrained surface geometric slope reduces the pressure gradient across the aerodynamic fairing 26.

In an example, the maximum thickness t can be positioned between about 25% and about 35% of the chord length c from the leading edge 40. In another example, the maximum thickness t is less than about 30% of the chord length c from the leading edge 40. In an example, the center of the inner support 28 is positioned along the chord length c to align with the maximum thickness t, as depicted in FIG. 3, such that the drag caused by the diameter D of the inner support 28 corresponds to the drag caused by the thickness t of the airfoil. As depicted in FIG. 4, in another example, the center of the inner support 28 is positioned forward of the maximum thickness t such that the thickness of the aerodynamic fairing 26 is greater than the diameter D of the inner support 28.

As depicted in FIGS. 3-4, in an example, the inner support 28 can be positioned within the aerodynamic fairing 26 to define a cuff portion 46 positioned between the leading edge 40 and the inner support 28 for providing an aerodynamic contour to the nose portion 38 of the aerodynamic fairing. In an example, the width of the cuff portion 46 is at least about 1% of the chord length c. In another example, the width of the cuff portion 46 is between about 1% of the chord length c and about 10% of the chord length c. In yet another example, the width of the cuff portion 46 is about 7% of the chord length c.

Figure 9:
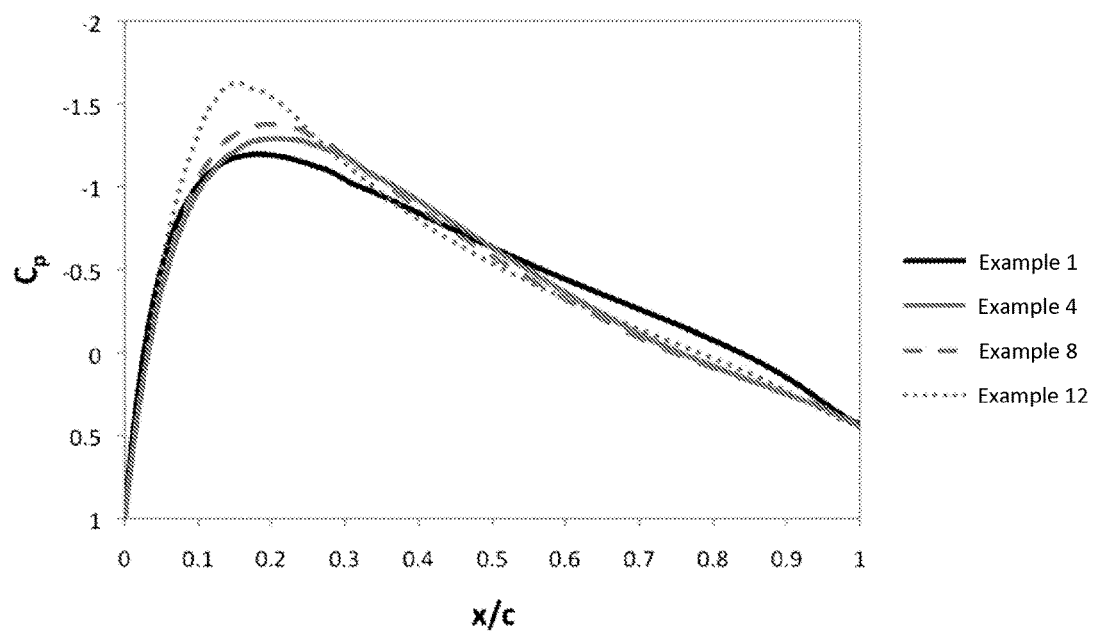
FIG. 9 is a graphical representation of drag coefficient as a function of thickness to chord length ratio for an aerodynamic fairing according to an example of the present subject matter.

In an example, the aerodynamic fairing 26 can minimize the turbulence created by the inner support 28 by reducing the drag caused by the cylindrical inner support 28. The diameter D of the inner support 28 is a factor in the amount of drag created by the tower assembly 24 as the diameter D of the inner support 28 defines the minimum width of the face presented to the wind. The drag coefficient $C_{d,D}$ for the tower assembly 24 as a function of the diameter D of the inner support 28 can be expressed as:

$$C_{d,D} = \frac{F_d'}{1/2 \rho V^2 D}$$

where $F_d'$ is the 2D drag for per unit length, $\rho$ is the density, free-stream flow velocity of the wind and D is the outer diameter of the inner support 28. As illustrated in FIG. 9, in an example, the ratio of the thickness t to cord length c of the aerodynamic fairing for minimizing drag based on the diameter D of the inner support 28 can be between about 25% to about 45%. In another example, the thickness to chord length ratio can at least about 30%. In yet another example, the thickness to chord length ratio can be at least about 35%. Surface roughness caused by debris accumulating on the aerodynamic fairing 26 or deforming the nose portion 38 of the aerodynamic fairing 26 can cause the boundary layer to transition to turbulent near the leading edge. Accordingly, in certain examples, the thickness to chord length ratio can be increased by about 5% to about 10% to account for the likely surface roughness. In an example, the drag coefficient $C_{d,D}$ for the aerodynamic fairing 26 is less than 0.2. In another example, the drag coefficient $C_{d,D}$ for the aerodynamic fairing 26 is less than 0.05.

Figure 10:
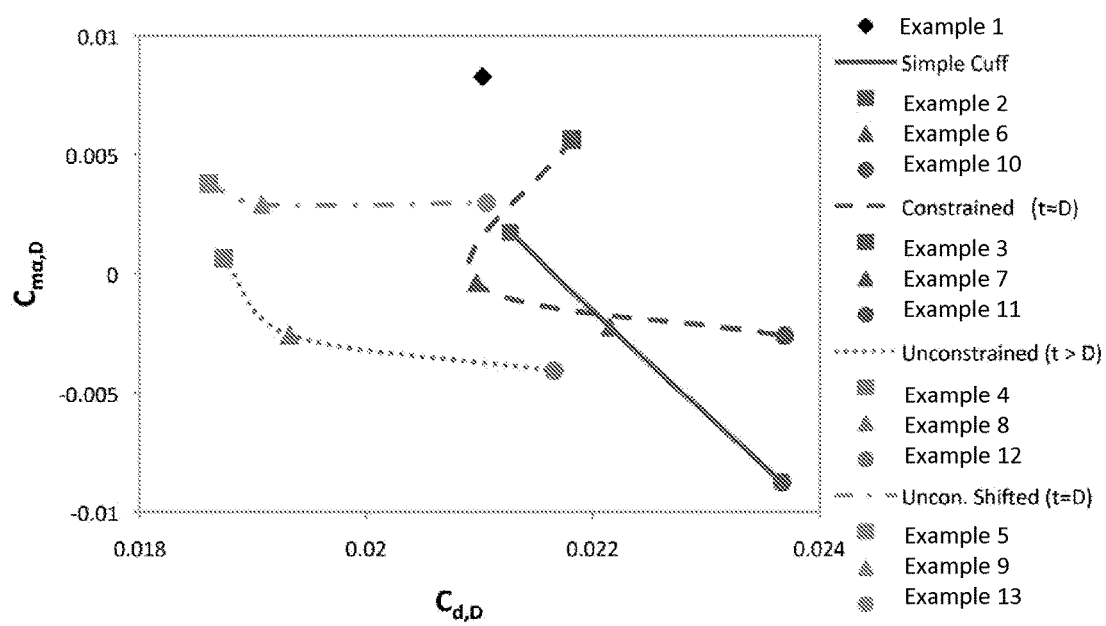
FIG. 10 is a graphical representation of drag coefficient plotted against 2D moment coefficient for various examples of the present subject matter.

In an example, tower assembly 24 further includes a rotatable joint allowing the aerodynamic fairing 26 to rotate about the central axis b-b of the inner support 36 to orient the nose portion 38 toward the wind direction. The change in a moment coefficient about the inner support 28 with respect to an angle of attack of the wind direction can be expressed as:

$$C_{m\alpha} = \frac{\partial C_m}{\partial \alpha}\bigg|_{x_D}$$

Where $C_m$ is the 2D moment coefficient, $\alpha$ is the angle of attack of the wind direction and $x_D$ is the location along the air foil chord line x divided by the chord length c, wherein the location is the tower center. In an example, the aerodynamic fairing 26 is shaped such that the moment coefficient $C_{m\alpha}$ is negative when the angle of attack is positive or positive when the angle of attack is negative such that the aerodynamic fairing 26 passively rotates on the rotatable joint to self-align with the wind direction. In an example, the center of inner support 28 is positioned along the chord length c at the maximum thickness t where the maximum thickness t is positioned less than about 30% of the chord length from the leading edge 40 as depicted in FIG. 3. In another example, the center of inner support 28 is positioned upwind of the maximum thickness t such that the center of the inner support 28 is less than about 30% of the chord length from the leading edge 40 as depicted in FIG. 4. The forward positioning of the inner support 28 within the aerodynamic fairing 26 can provide the appropriate moment coefficient $C_{m\alpha}$ for self-aligning of the aerodynamic fairing 26. As illustrated in FIG. 10, forward positioning of the inner support 28 provides the proper moment $C_{m\alpha}$ while minimizing the impact of the increased thickness t on the drag coefficient $C_{d,D}$. In this configuration, the maximum thickness t of the aerodynamic fairing 26 is greater than the diameter D of the inner support 28. The forward shift of the inner support 28 relative to the maximum thickness t can also reduce the pressure gradient across the aerodynamic fairing 26 and prevent separation across the aerodynamic fairing 26 to reduce the wake behind the tower assembly 24. In certain examples, the rotatable joint can be motorized to manually align the aerodynamic fairing 26 with the wind direction or position the aerodynamic fairing 26 at an angle transverse to the wind direction.

As depicted in FIGS. 5-6, in an example, the rotor blades 32 can be radially mounted on the rotor shaft 30 such that passing wind rotates the rotor blades 32 to rotate the rotor shaft 30 about the rotational axis a-a. The rotor blades 32 can be positioned to extend radially from the rotor shaft 30 and angled such that wind moving generally parallel to rotational axis a-a rotates the rotor shaft 30 to operate the electric generator 34. In certain examples, the rotor blades 32 can be configured to rotate if the angle of attack of the wind is non-zero. The rotor blade 32 can extend perpendicularly from the rotor shaft 30 or extend radially from the rotor shaft 30 along a non-perpendicular angle. In an example, the turbine assembly 22 can include an aerodynamic cover 35 that reduces the aerodynamic drag and wake created by the electrical generator 34, the rotor shaft 30 or the connection between the tower assembly 24 and the electric generator 34.

In an example, the rotor blades 32 can comprise segmented ultralight morphing rotor ("SUMR") blades. In this configuration, the rotor blades 32 are segmented to facilitate bending the rotor blade 32 in the direction of the wind as the wind speed increases. The force caused by the bending of the rotor blade 32 rotates the generator 34 to align the rotational axis a-a with the wind direction. Similarly, the coning of the bending rotating rotor blades 32 maintains the rotor blades 32 in alignment with the wind direction. As illustrated in FIG. 2, the rotor blades 32 can be configured to bend to varying degrees depending on the rotational position of the rotor blades 32 relative to the tower assembly 24.

In an example, the rotatable mount 36 can be configured to permit free rotation of the turbine assembly 22 such that the turbine assembly 22 self-aligns with the wind direction from uneven air pressure on the rotor blades 32. In this configuration, wind travelling along an angle of attack transverse to the rotational axis a-a creates a pressure differential on the rotating rotor blades 32 applying torque to the rotor shaft 30 to rotate the turbine assembly 22 until the rotational axis a-a aligns with the wind direction. In certain examples, the rotatable mount 36 can be selectively locked to fix the turbine assembly 22 in particular orientation regardless of the alignment of the wind direction to the rotational axis a-a. In another example, the rotatable mount 36 is motorized for controlled orientation of the turbine assembly 22.

As depicted in FIGS. 2 and 5-6, the rotor blades 32 can be setback 48 on the rotor shaft 30 from the inner support 26 to provide sufficient clearance for the tail portion 42 of the aerodynamic fairing 26 as the rotor blades 32 are rotated. An increased setback 48 can place structural strain on the inner support 28 requiring an increased diameter D or secondary supporting structures including, but not limited to a counter weight 50 in the nose portion 38 (depicted in FIGS. 5-6), support cables or struts, weighted footing and other reinforcement structures. The distance from the center of the inner support 26 to the trailing edge 44 of the aerodynamic fairing 26 can be expressed non-dimensionally as:

$$\frac{x_{TE} - x_D}{D}$$

where $x_{TE}$ is the chord position at the trailing edge 44. In an example, the setback distance 48 from the center of the inner support 26 and the trailing edge 44 can be between about 2.025 and about 2.500 times the diameter of the inner support 28.

A method 60 for fitting an aerodynamic fairing 26 to an inner support 26, according to an example includes fixing an inner support 28 having generally circular cross-section having a maximum diameter D in a generally vertical orientation as depicted in FIGS. 1 and 2. The method 60 can further include providing an aerodynamic fairing 26 having a symmetric airfoil cross-section having a leading edge 40 and a trailing edge 44. The aerodynamic fairing 26 can have a maximum thickness t and a chord length c extending between the leading edge 40 and the trailing edge 44, the maximum thickness t being positioned about 30% of the chord length c from the leading edge 40. The method 60 can further include positioning the aerodynamic fairing 26 over the inner support 28 such that a center of the inner support 28 is forward of the maximum thickness t and defining a cuff 42 between the inner support 28 and the leading edge 40. In an example, the aerodynamic fairing 26 can be positioned to align the center of the inner support 28 with the maximum thickness t.

VARIOUS NOTES & EXAMPLES

Representative dimensions for aerodynamic fairing 26, according to various examples of the present subject matter, are listed below.

| | t/c | t/D | $x_D$ | $x_t$ | $C_{d,D}$ | $C_{m\alpha D}$ | $X_{TE}$-$X_D$ |
|---|---|---|---|---|---|---|---|
| Ex. 1 | 0.330 | 1.000 | 0.301 | 0.301 | 0.0210 | 0.00828 | 0.699 |
| Ex. 2 | 0.330 | 1.000 | 0.256 | 0.256 | 0.0213 | 0.00172 | 0.744 |
| Ex. 3 | 0.330 | 1.000 | 0.256 | 0.253 | 0.0218 | 0.00562 | 0.744 |
| Ex. 4 | 0.333 | 1.007 | 0.256 | 0.284 | 0.0187 | 0.00066 | 0.744 |
| Ex. 5 | 0.333 | 1.000 | 0.284 | 0.284 | 0.0186 | 0.00376 | 0.716 |
| Ex. 6 | 0.330 | 1.000 | 0.231 | 0.231 | 0.0222 | -0.00224 | 0.769 |
| Ex. 7 | 0.330 | 1.000 | 0.231 | 0.225 | 0.0210 | -0.00040 | 0.769 |
| Ex. 8 | 0.336 | 1.013 | 0.231 | 0.279 | 0.0193 | -0.00256 | 0.769 |
| Ex. 9 | 0.336 | 1.000 | 0.279 | 0.279 | 0.0191 | 0.00290 | 0.721 |
| Ex. 10 | 0.330 | 1.000 | 0.176 | 0.176 | 0.0234 | -0.00876 | 0.824 |
| Ex. 11 | 0.331 | 1.001 | 0.176 | 0.196 | 0.0237 | -0.00260 | 0.824 |
| Ex. 12 | 0.355 | 1.034 | 0.176 | 0.248 | 0.0217 | -0.00406 | 0.824 |
| Ex. 13 | 0.355 | 1.000 | 0.248 | 0.248 | 0.0211 | 0.00296 | 0.752 |

The aerodynamic fairings 26, in examples 3, 7 and 11, are constrained such that the surface geometric slope of the aerodynamic fairing 26 at the maximum thickness t is fixed at zero. The aerodynamic fairings 26, in examples 4-5, 8-9 and 12-13, are unconstrained such that the surface geometric slope of the aerodynamic fairing 26 at the maximum thickness t can be non-zero. The aerodynamic fairings 26, in examples 5, 9 and 13, are positioned such that the inner support 28 is forward of the maximum thickness t.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A wind turbine, comprising:
    an inner support having a generally circular cross-section having a center axis and an outer diameter;
    an electrical generator including a rotor shaft rotatable about a rotational axis, the electrical generator is positioned on the inner support such that the rotor shaft extends radially outward from the center axis;
    at least one rotor blade extending radially from the rotor shaft; and
    an aerodynamic fairing positioned over at least a portion of the inner support, the aerodynamic fairing having a symmetric airfoil cross-section having a chord length extending between a leading edge and a trailing edge and a maximum thickness positioned between 25% and 35% of the chord length from the leading edge such that a cuff portion is defined between the leading edge and the inner support;
    wherein the center axis of the inner support is positioned along the chord length toward the leading edge relative to the location along the chord length corresponding to the maximum thickness, the inner support having a diameter less than the maximum thickness.

2. The wind turbine of claim 1, wherein the at least one rotor blade is oriented on the rotor shaft such that the at least one rotor blade is positioned downwind of the electrical generator and the inner support.

3. The wind turbine of claim 2, wherein the rotor shaft is sized to position the at least one rotor blade at least a minimum setback distance from the trailing edge of the aerodynamic fairing;
    wherein the setback distance is between 2 and 2.6 times the outer diameter of the inner support.

4. The wind turbine of claim 1, wherein the maximum thickness of the aerodynamic fairing is 25% to 45% of the chord length.

5. The wind turbine of claim 1, wherein the cuff portion has a width between 1% and 10% of the chord length.

6. The wind turbine of claim 1, wherein the drag coefficient of the aerodynamic fairing is less than 0.2.

7. The wind turbine of claim 1, wherein the aerodynamic fairing has a continuous curvature between the leading edge and the trailing edge.

8. The wind turbine of claim 7, wherein a surface geometric slope of the continuous curvature of the aerodynamic fairing is zero at the maximum thickness.

9. The wind turbine of claim 1, wherein the inner support includes a rotatable mount;
    wherein the electrical generator is coupled to the rotatable mount for rotating the rotor shaft and the at least one rotor blade about the center axis of the inner support.

10. The wind turbine of claim 1, wherein the aerodynamic fairing is rotatably mounted to the inner support for rotating the aerodynamic fairing about the center axis of the inner support.

11. A tower assembly for rotatably supporting a turbine assembly for a wind turbine, comprising:
    an inner support having a generally circular cross-section, the inner support having a center axis and an outer diameter; and
    an aerodynamic fairing positioned over at least a portion of the inner support, the aerodynamic fairing having a symmetric airfoil cross-section having a chord length extending between a leading edge and a trailing edge and a maximum thickness positioned between 25% and 35% of the chord length from the leading edge such that a cuff portion is defined between the leading edge and the inner support;

wherein the center axis of the inner support is positioned along the chord length toward the leading edge relative to the location along the chord length corresponding to the maximum thickness, the inner support having a diameter less than the maximum thickness.

12. The tower assembly of claim 11, wherein the maximum thickness of the aerodynamic fairing is 25% to 45% of the chord length.

13. The tower assembly of claim 11, wherein the cuff portion has a width between 1% and 10% of the chord length.

14. The tower assembly of claim 11, wherein the drag coefficient of the aerodynamic fairing is less than 0.2.

15. The tower assembly of claim 11, wherein the aerodynamic fairing has a continuous curvature between the leading edge and the trailing edge.

16. The tower assembly of claim 15, wherein a surface geometric slope of the continuous curvature of the aerodynamic fairing is zero at the maximum thickness.

17. The tower assembly of claim 11, wherein the aerodynamic fairing is rotatably mounted to the inner support for rotating the aerodynamic fairing about the center axis of the inner support.

18. The tower assembly of claim 17, wherein the center axis of the inner support is between the leading edge and the maximum thickness of the aerodynamic fairing.

19. The tower assembly of claim 11, wherein the cuff portion has a width between 1% and 10% of the chord length.

* * * * *